(12) United States Patent
Pruden et al.

(10) Patent No.: US 6,280,142 B1
(45) Date of Patent: Aug. 28, 2001

(54) PRESSURE RELIEF DEVICE FOR A PROPELLER HUB

(75) Inventors: Robert W. Pruden, Enfield, CT (US); Paul A. Carvalho, Westfield, MA (US)

(73) Assignee: United Technologies Corporation, Windsor Locks, CT (US)

(*) Notice: Subject to any disclaimer, the term of this patent is extended or adjusted under 35 U.S.C. 154(b) by 0 days.

(21) Appl. No.: 09/467,556

(22) Filed: Dec. 20, 1999

(51) Int. Cl.$^7$ ................................................. F01D 25/00
(52) U.S. Cl. .......................... 416/146 A; 415/9; 137/68.11
(58) Field of Search ...................... 415/9; 416/146 A; 137/68.23, 68.19, 68.11

(56) References Cited

U.S. PATENT DOCUMENTS

| | | | |
|---|---|---|---|
| 3,377,957 | * 4/1968 | Bilton | 415/9 |
| 4,365,643 | 12/1982 | Masclet et al. | 137/70 |
| 4,487,104 | 11/1949 | Cooper | 220/89 |
| 5,632,505 | * 5/1997 | Saccone et al. | 280/737 |

FOREIGN PATENT DOCUMENTS

| | | |
|---|---|---|
| 803506 | 4/1951 | (DE). |
| 1318057 | 5/1973 | (GB). |
| 1469573 | 4/1977 | (GB). |
| WO-00/66428-A1 | * 11/2000 | (WO). |

* cited by examiner

*Primary Examiner*—Edward K. Look
*Assistant Examiner*—Ninh Nguyen

(57) ABSTRACT

A pressure relief device for preventing over pressurization of a propeller hub is disclosed. The pressure relief devices is designed to fit within a ball hole opening in the hub arm of the hub. The pressure relief device includes a housing which sealably interfaces with an inner wall of the ball hole opening and a pressure relief insert which sealably interfaces with the housing. The pressure relief device includes a plurality of fracture tabs which engage an end of the housing exposed to hub cavity pressure. The fracture tabs are designed to break at a design pressure allowing the pressure relief insert to be forced out of the housing thus breaking the seal between the pressure relief insert and housing thereby venting the hub cavity.

14 Claims, 2 Drawing Sheets

PRESSURE RELIEF DEVICE FOR A PROPELLER HUB

TECHNICAL FIELD

This invention is directed to a pressure relief device for the cavity of a propeller hub, and more particularly to a pressure relief device that serves as ball hole loading cover in a propeller hub and is designed to relieve the hub internal pressure at a predetermined value.

BACKGROUND ART

Typical propulsion systems in modern aircraft comprise a propeller, propeller blades mounted in arm bores extending from the propeller hub and a pitch change actuator for changing the pitch of the propeller blades.

The propeller blade is mounted in the arm bore for movement therein. Blade retention bearings are located circumferentially within the arm bore such to facilitate pitch change of the propeller blade. The hub is sealed and contains a specified volume of oil to lubricate the blade retention bearings. The minimum oil volume is chosen to minimize weight and ensure the arm bores are completely filled and oil distributes evenly within the cavity when acted on by centrifugal force.

The pitch change actuation device uses high pressure hydraulic fluid applied to piston located within the pitch change actuator to change blade pitch. A leak in the pitch change actuator could cause the hub to become pressurized causing high loads on the propeller components. Pitch change actuation systems are designed to place the blade in a feather position to minimize drag upon loss of hydraulic pressure. Therefore, it is more desirable to vent the hub cavity and lose pitch change capability than to pressurize the hub.

There are several prior art methods for limiting hub cavity pressure. Some systems vent the hub cavity back to a sump in the control system. If the cavity is a closed system, a pressure relief device is employed to vent the system overboard. This device can be a valve, or a component designed to fail at a predetermined pressure. FIGS. 1 and 2 illustrate prior art relief valves designed to open at a predetermined pressure. Pressure relief valves add expense and increase system weight because a mounting interface must be provided for the valve. Relief valves are also typically low flow devices, and therefore provide minimal over pressure protection in the event that there is a high flow rate leak into the hub cavity.

FIG. 1 illustrates a pressure relief device 10' wherein the cover 12' is designed to fracture releasing the spherical seal 14' to vent the hub cavity. The spherical seal 14' is located in bearing race 16' which is in fluid communication with the hub cavity. The cover 16' is mounted to an external surface 18' of the hub 20'. This device requires external mounting hardware and exhibits wide tolerances in activation pressure due to its configuration and dimensional tolerances.

FIG. 2 illustrates a second pressure relief device 22' positioned in a passage 24' located within the hub housing 26'. The pressure relief device requires a housing 28' which is attached to the hub housing 26'.

Therefore, there exists a need for a pressure relief device that provides relief for a rapid increase in hub, due to high flow rate leakage into the hub, while minimizing weight and the need for external mounting bosses and hardware.

DISCLOSURE OF THE INVENTION

The primary object of the present invention is to provide a pressure relief device which is actuated a predictable pressure for a hub cavity.

Another object of the present invention is to provide a pressure relief device that mounts in the ball loading hole of a bearing race, requiring no external mounting features.

The pressure relief device according to the subject invention includes a housing adapted in size and shape to fit in a ball loading hole of a propeller hub. The housing is cylindrical in shape and is open at both ends. The outer wall of the housing includes a first portion having a first circumference located at a first end and a second portion located at a second end having a second circumference. The second circumference is greater than the first circumference, creating a stepped portion at the intersection of the first and second circumferences. A first o-ring is located on the first portion adjacent the stepped portion.

The pressure relief device also includes a pressure relief insert. The pressure relief insert includes a cylindrical portion that is adapted in size and shape to fit within the first housing. A first end of the cylindrical portion is solid and has a plurality of fracture tabs protruding radially therefrom. The first end of the pressure relief insert also includes a channel with a second o-ring disposed therein.

A plurality of resilient fingers extend axially from a second end of the cylindrical portion. The resilient fingers are arranged along a circumferential edge of the second end. The resilient fingers include a stepped portion distally located from the second end of the cylindrical portion. The distance from the stepped portion to the fracture tabs is equal to the length of the outer wall of the housing such that when the pressure relief insert is inserted into the housing the fracture tabs will rest on the first end of the housing and the stepped portion of the resilient fingers rest on the second end of the housing thus locking the pressure relief insert within the housing. The second o-ring located on the cylindrical portion of the pressure relief insert forms a seal between the pressure relief insert and the housing.

The wall of the ball loading hole has a third circumference located at an external opening, and a fourth circumference, located a distance from the external opening. The third circumference is greater than the fourth circumference forming a complementary step is formed at the intersection of the third and fourth circumferences. Located just inside the ball loading hole is a channel adapted in size and shape to receive a snap ring.

The pressure relief device is inserted into the ball loading hole such that the first end of the pressure relief insert is exposed to the pressure in the hub cavity. When inserted, the first o-ring forms a seal between the outer wall of the housing and the wall of the ball loading hole. The complementary step of the ball loading hole and the step of the outer wall of the housing cooperate to limit travel of the pressure relief device toward the hub cavity when the pressure within the hub cavity is less than the external pressure. The snap ring retains the pressure relief device within the ball loading hole when high pressure is present in the hub cavity.

The pressure tabs are designed to fracture at a desired pressure. The fracture occurs at the intersection of the fracture tab and cylindrical portion of the pressure relief insert allowing the pressure relief insert to be forced out of the housing by the cavity pressure. The seal between the pressure relief insert and the housing will be broken when the pressure relief insert has traveled a sufficient distance such that the second o-ring is no longer compressed.

BEST MODE FOR CARRYING OUT THE INVENTION

Figure 1:
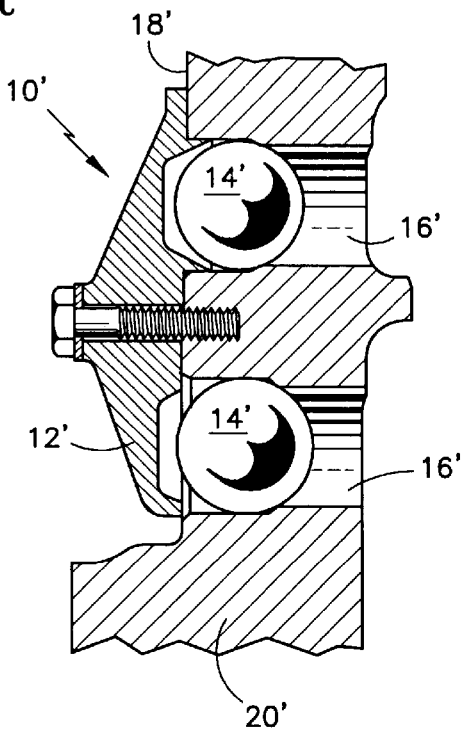
FIG. 1 is a plan view of a prior art pressure relief device.
Figure 2:
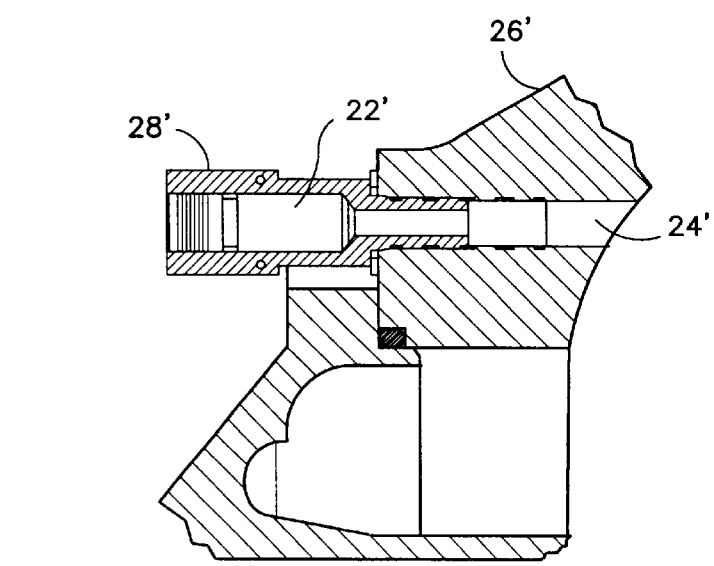
FIG. 2 is a plan view of a prior art pressure relief device.
Figure 3:
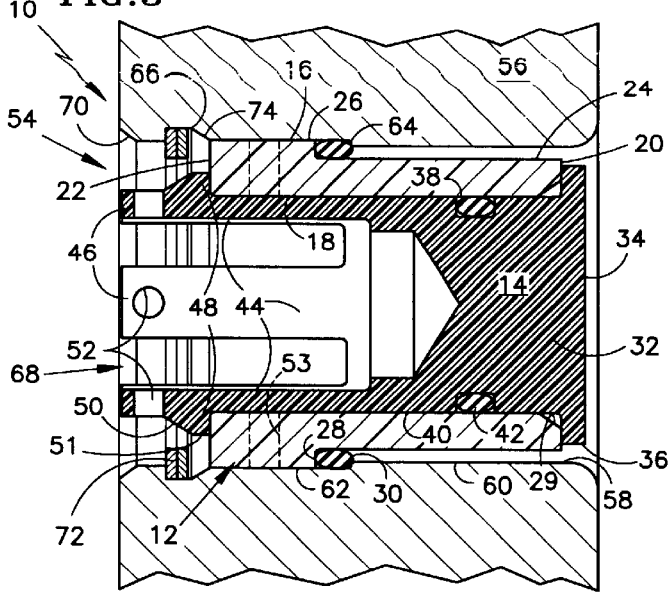
FIG. 3 is a sectional view of a pressure relief device according to the present invention.

Referring now to the drawings in detail there is shown in FIG. 3 a plan view of a pressure relief device 10 according to the present invention. The pressure relief device 10 consists of two major portions, a housing 12, and a pressure relief insert 14. The housing 12 is cylindrical in shape and includes an outer wall 16 and an inner wall 18. The housing is also open at a first 20 and a second end 22. The outer wall 16 has a first portion 24 adjacent the first end 20 having a first circumference and second portion 26 adjacent the second end 22 having a second circumference greater than first circumference. A stepped portion 28 is created at the intersection of the first 24 and second 26 portions. A first o-ring 30 is positioned on first portion 24 adjacent stepped portion 28. A chamfer 29 is located on the inside wall 18 at the first end 20 of housing 12.

Figure 4:
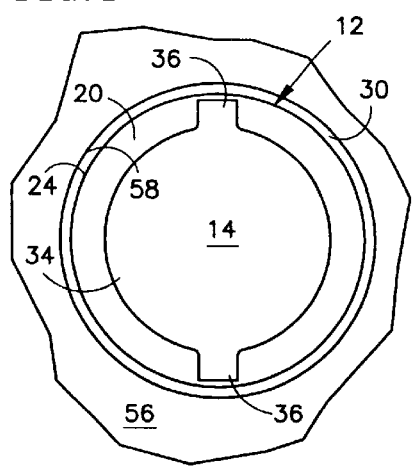
FIG. 4 is a plan view of a first end of the pressure relief device according to the present invention.

As shown in FIGS. 3 and 4, the pressure relief insert 14 is cylindrical in shape and is adapted for insertion into the housing 12. A solid portion 32 is located at a first end 34 and has a plurality of fracture tabs 36 extending radially therefrom. A groove or channel 38 is formed on an surface 40 of the first end 34 wherein a second o-ring 42 is disposed.

Figure 5:
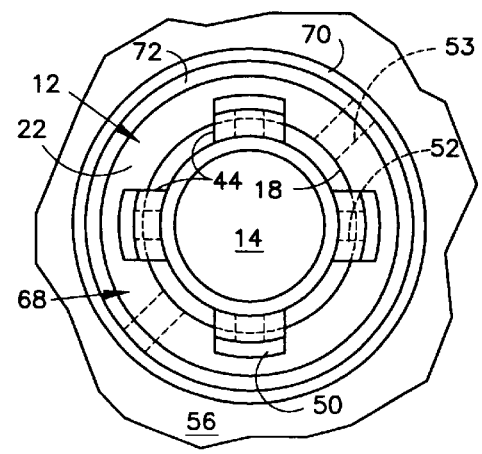
FIG. 5 is a plan view of a second end of the pressure relief device according to the present invention; and, FIG. 6 is a view similar to FIG. 3 showing a third embodiment.

As shown in FIGS. 3 and 5, a plurality of resilient fingers 44 extend axially from the first end 34 of the pressure relief insert 14. The resilient fingers 44 form a continuation of outer surface 40 of the pressure relief insert 14. A stepped portion 48 is formed at a distal end 46 of the resilient fingers 44. The distance between stepped portion 48 and fracture tab 36 is approximately equal to the distance between the first 20 and second 22 ends of housing 12. A sloped surface 50 is located on the outer surface 51 of the resilient fingers 44 to aid in assembly of the pressure relief device 10. The distal end 46 of resilient finger 44 also contains a hole 52 to aid in installation and removal of the pressure relief device 10 where the internal hub pressure needed to break the fracture tabs 36 is greater than the force required than the force required to remove the pressure relief device 10 from the ball loading hole 54.

Alternatively, through holes 53 can be located in second portion 26 of housing 12 to facilitate removal of the pressure relief device 10.

In the preferred embodiment the housing 10 and relief insert 14 are formed by injection molding of an acetal resin such DELRINO® by Dupont.

The pressure relief device 10 is assembled by sliding the pressure relief insert 14 into housing 12. The sloped surface 50 of resilient finger 44 cooperates with chamfer 29 of the housing 10 to flex the resilient fingers 44 inward allowing the pressure relief insert 14 to be inserted into the housing 12. Chamfer 29 also allows the second o-ring 42 to be inserted into the housing 12 without cutting the second o-ring 42. When the pressure relief device 10 is fully assembled the resilient fingers 44 will snap over the second end 22 of the housing 12 as shown in FIG. 3. The resilient fingers 44 cooperate with the second end 22 of housing 12 and the fracture tabs 36 cooperate with the first end 20 of housing 12 to fix the position of the pressure relief insert 14 relative housing 12. The second o-ring 42 forms a seal between the housing 12 and the pressure relief insert 14.

The ball loading hole 54 is formed in the arm bore arm of a hub (not shown). The inner wall 58 of the ball loading hole 54 consists of a first portion 60 having a first circumference and a second portion 62 located nearest an external opening 68 of the ball loading hole 54 having second circumference. The first circumference and second circumference are sized to receive the pressure relief device such that when inserted the first o-ring 30 forms a seal there between. The second circumference is greater than the first circumference creating a complementary stepped portion 64 at the intersection of the first 60 and second 62 portions.

The complementary stepped portion 64 cooperates with the stepped portion 28 of housing 12 to prevent movement of the pressure relief device 10 toward the hub cavity (not shown) in the event that the pressure external to the hub is greater than the pressure in the hub cavity.

A groove or channel 66 is located in the inner wall 58 of the second portion 62 proximate an external opening 68 of the ball loading hole 54. A first chamfer 70 is formed in the second portion 62 at the external opening 68. The first chamfer 70 facilitates insertion of the pressure relief device 10 into the ball loading hole 54 and prevents damage to the first o-ring 30. A snap ring 72 is inserted into groove or channel 66 after the pressure relief device 10 is inserted into the ball loading hole 54. Channel 66 includes a second chamfer 74 that also facilitates insertion of the pressure relief device 10. The snap ring prevents the pressure relief device 10 from being forced out of the ball loading hole 54 in the event that the pressure external to the hub is less than the hub cavity pressure.

In operation the pressure relief device 10 is inserted in the ball loading hole 54 of the bore arm 56. The second o-ring 42 forms a seal between the inner wall 58 of the ball loading hole 54 and the outer wall 16 of the housing 12. The snap ring 72 prevents the pressure relief device 10 from being forced out of the ball loading hole 54 while the stepped portion 28 of the housing 10 in cooperation with the complementary stepped surface 64 of the inner wall 58 of the ball loading hole 54 prevents the pressure relief device 10 from being forced into the hub cavity.

The stepped portion 48 of the resilient fingers 44 and the fracture tabs 36 fix the position of the pressure relief insert 14 relative the housing 12. The first o-ring 30 forms a seal between the pressure relief insert 14 and the housing 12 thus sealing the hub cavity. In the event that hub cavity pressure exceeds the design pressure of the fracture tabs 36, the fracture tabs 36 will break along the circumference of the first end 20 of the housing 12. This allows the hub cavity pressure to force the pressure relief insert 14 out of the housing 12 until the second o-ring 42 no longer forms a seal between the pressure relief insert 14 and the housing 12, thus venting the hub cavity to an external pressure.

In a second embodiment of the present invention the fracture tabs 36 may be welded, soldered or adhered to the pressure relief insert 14.

Figure 6:
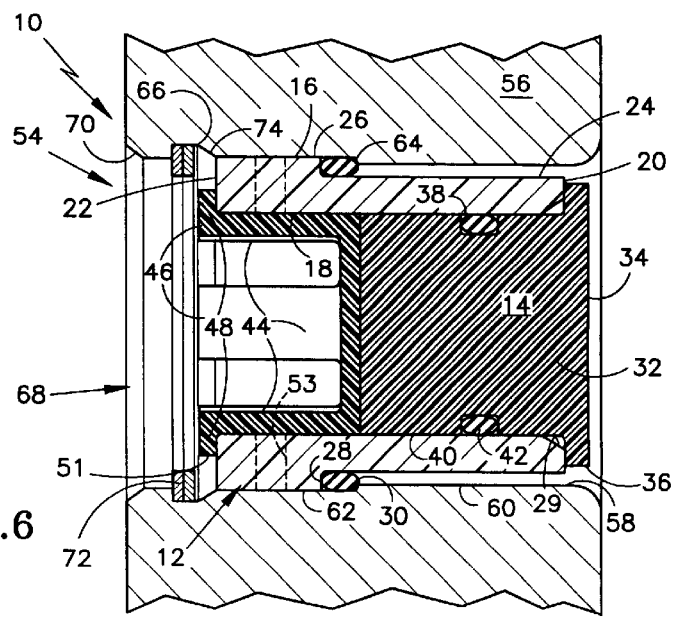

A third embodiment of the present invention is shown in FIG. 6. The resilient fingers 44 of the first embodiment are replaced by plug 76 which is inserted into the housing 12 and bonded to a top surface 78 of the pressure relief insert 14.

The primary advantage of the present invention is to provide a pressure relief device which is actuated a predictable pressure for a hub cavity.

Another advantage of the present invention is to provide a pressure relief device that mounts in the ball loading hole of a bearing race, requiring no external mounting features.

Although the invention has been shown and described with respect to a best mode embodiment thereof, it should be understood by those skilled in the art that the foregoing and various other changes, omissions, and additions in the form and detail thereof may be made without departing from the spirit and scope of the invention.

What is claimed is:

1. A pressure relief device for a propeller hub, said propeller hub defining a chamber, and a port for venting the chamber, said pressure relief device comprising:
   a first housing for sealably engaging a wall of the port; and
   a pressure relief insert for sealably engaging said first housing to seal the chamber, said pressure relief insert comprising a fracture tab wherein said fracture tab fractures at a pressure to vent the chamber.

2. The pressure relief device of claim 1 wherein said first housing comprises a cylindrical wall defining a cavity open at a first and a second end for receiving said pressure relief insert therein.

3. The pressure relief device of claim 2 wherein said pressure relief insert comprises a plurality of resilient fingers wherein said plurality of resilient fingers and said fracture tab cooperate with said first housing to fix the position of said pressure relief insert relative said first housing when said pressure relief insert is inserted in said cavity.

4. The pressure relief device of claim 3 wherein said pressure relief insert comprises an o-ring for sealably engaging said first housing when said pressure relief insert is inserted in said cavity.

5. The pressure relief device of claim 1 wherein said first housing and said pressure relief insert comprise an acetal resin.

6. The pressure relief device of claim 1 wherein said fracture tab is an integral extension of said pressure relief insert.

7. A pressure relief system for a propeller hub, the propeller hub including a chamber; and a bore arm for mounting a propeller blade therein, the bore arm including a plurality of bearings for facilitating movement of the propeller blade, wherein the bore arm is in fluid communication with the chamber for providing lubricant to the plurality of bearings, the bore arm further including a ball loading hole for removal and installation of the plurality of bearings, said pressure relief system comprising:
   a first housing for sealably engaging a wall of the ball loading hole; and
   a pressure relief insert for sealably engaging said first housing to seal the chamber, said pressure relief insert comprising a fracture tab wherein said fracture tab fractures at a pressure to vent the chamber.

8. The pressure relief system of claim 5 wherein said first housing comprises a cylindrical wall defining a cavity open at a first and a second end for receiving said pressure relief insert therein.

9. The pressure relief system of claim 7 wherein said pressure relief insert comprises a plurality of resilient fingers wherein said plurality of resilient fingers and said fracture tab fix the position of said pressure relief insert relative said first housing when said pressure relief insert is inserted in said cavity.

10. The pressure relief device of claim 7 wherein said pressure relief insert comprises an o-ring for sealably engaging said first housing when said pressure relief insert is inserted in said cavity.

11. The pressure relief device of claim 7 wherein said cylindrical wall comprises a step and wherein said wall of said ball loading hole comprises a complementary step for engaging said step to fix the position of said first housing relative the ball loading hole.

12. The pressure relief device of claim 11 wherein said first housing comprises an o-ring wherein said o-ring forms a seal between said step and said complementary step when said first housing is positioned in the ball loading hole.

13. The pressure relief system of claim 7 wherein said first housing and said pressure relief insert comprise an acetal resin.

14. The pressure relief system of claim 7 wherein said fracture tab is an integral extension of said pressure relief insert.

* * * * *